Jan. 5, 1932.　　　　J. L. FINCH　　　　1,839,385
SYSTEM FOR PARALLEL OPERATION OF MOTORS
Original Filed Feb. 16, 1925
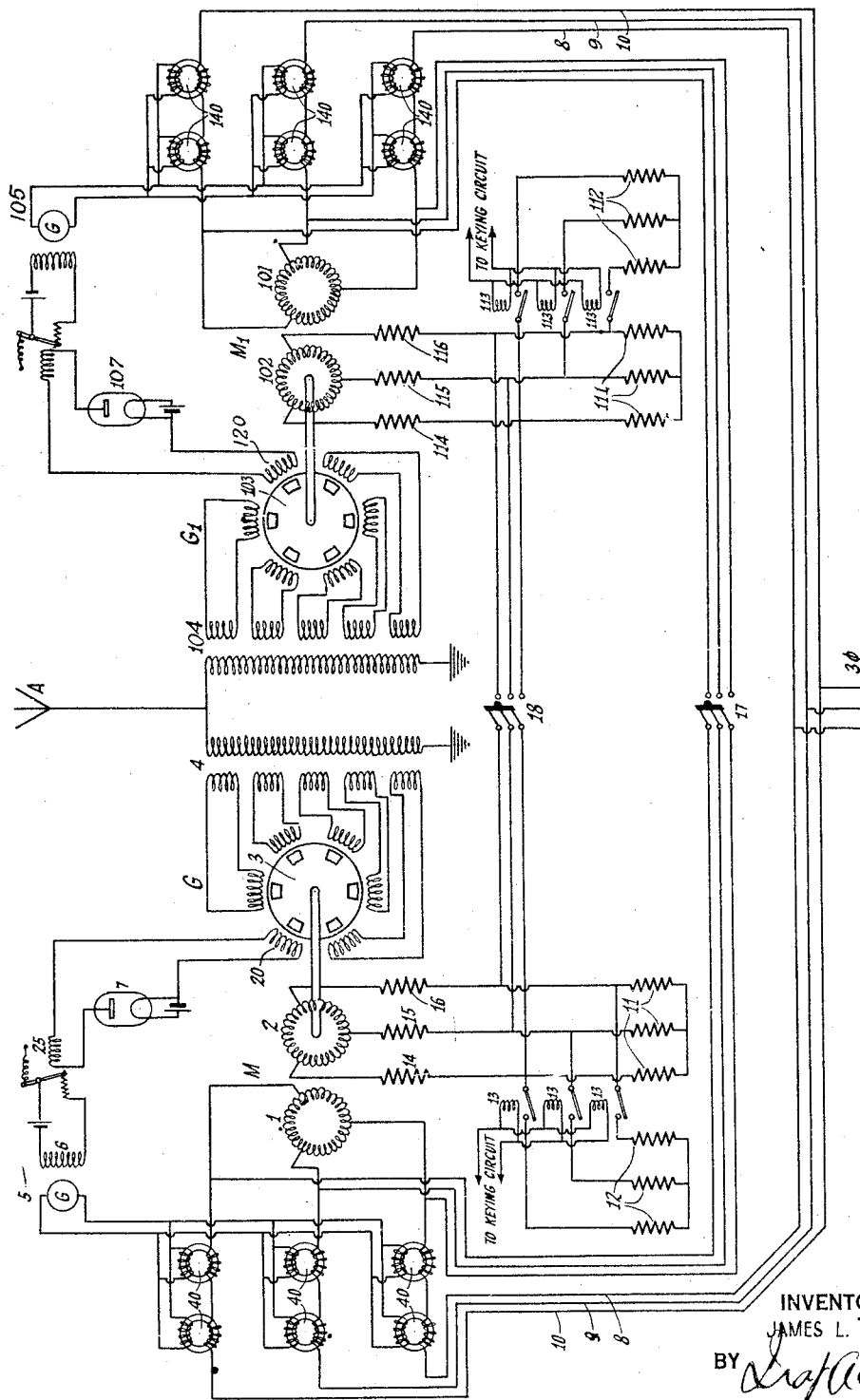
INVENTOR
JAMES L. FINCH
BY
ATTORNEY Patented Jan. 5, 1932

1,839,385

UNITED STATES PATENT OFFICE

JAMES L. FINCH, OF NEW YORK, N. Y., ASSIGNOR TO RADIO CORPORATION OF AMERICA, A CORPORATION OF DELAWARE

SYSTEM FOR PARALLEL OPERATION OF MOTORS

Application filed February 16, 1925, Serial No. 9,536. Renewed December 28, 1929.

The invention concerns an arrangement for parallel operation of driving motors for alternators.

One object of the invention is to provide for steady operation of induction motors for driving alternators connected in parallel.

Another object of the invention is to provide for paralleling the primaries and secondaries of induction motors to give constant and equal speeds to the rotating elements and thus provide for synchronous operation.

Still another object of the invention is to provide for paralleling the primaries and secondaries of induction driving motors having regulating resistances in the secondary circuits partially common to all phases of the secondaries and partially individual to each phase.

In the operation of high frequency alternators in parallel for feeding the antenna of a modern high power radio transmission station it has been found desirable to provide a paralleling connection for both the primaries and secondaries of the driving motors in the usual installation. A plurality of rheostats are ordinarily connected in the secondary circuit to regulate the motor speed. The paralleling connection of the secondaries is connected ahead of these resistances and, therefore, each of these resistances affects the circuit characteristics of both motors. It is known that the impedance characteristics of the secondary of an induction motor vary considerably at different positions of the secondary and, therefore, as the motor rotates there is a constantly varying impedance and consequently a constantly varying circulating current in the tie circuit between the secondaries. These impedance characteristics are, of course, not identical in different machines and in consequence, certain torque harmonics exist which may induce hunting oscillations in the motor secondaries and, therefore, in the driven alternators. This tendency has been overcome to a large extent by placing a resistance, which may be termed a "smoothing" resistance in each motor secondary line ahead of the tie circuit. Such a resistance, of course, modifies the circulating current in each line and its effect on the circulating current is much greater than the effect of the internal impedance of the secondary windings. The instantaneous changes in the impedance of the windings of the motors will, therefore, have little effect as compared to the effect of the resistances on the circulating current and this circulating current will have substantially equal values in all positions of the motor secondary. The slight difference in the internal circuit constants of the rotors thereupon becomes unimportant and the tendency to hunt is greatly reduced.

The invention is shown, by way of example, in the accompanying drawings in which the single figure is a circuit diagram of a system conforming to the invention.

In this figure, A is an antenna having two branches in parallel, fed by the high frequency alternators G and $G_1$ through transformers 4 and 104. The high frequency alternators G and $G_1$ are of a well known type and are driven by induction motors M and $M_1$. The connections on the two sides of the figure are identical and it is, therefore, necessary to explain only those to the left of the figure including the motor M and the generator G. This motor comprises a primary winding 1 and a secondary winding 2. The primary 1 is energized from the three phase lines 8, 9 and 10 each including saturation coils indicated diagrammatically at 40. The saturation of the cores of these coils is varied by saturating coils connected to the direct current generator 5, having the current of its field 6 controlled by a relay 25 connected to the rectifier 7, which is in circuit with a coil 20 of the alternator. When the speed of the alternator begins to change the voltage in the coil 20 changes and thereby changes the excitation of the field 6, causing a corresponding change in the voltage of the generator 5 and varying the magnetic saturation of the magnetic cores of coils 40, thus changing the voltage on the motor primary and regulating its speed.

The primary 1 is tied to the primary 101 through a tie switch 17 as shown, thus placing them directly in parallel and providing for equal excitation.

The secondary speed is regulated generally by running rheostats 11 and changes in the load during keying are compensated for by the compensating rheostats 12 controlled by relays 13 which are connected to the keying circuit in a manner well known in the art.

The motor secondaries are tied together through the tie switch 18, thereby causing substantially equal speeds of the secondaries. In each line of each motor secondary is connected a resistance 14, 15 or 16 ahead of the tie circuit, which, although it has the effect of reducing the synchronizing torque, also has the effect of causing a comparatively equal synchronizing torque in all positions of the motor secondary. These resistances, therefore, have the effect of preventing the development of torque harmonics which would tend to induce hunting and provide for steady operation of the motors and, therefore, of the alternators.

The system disclosed is obviously adapted to many modifications which would readily suggest themselves for one skilled in the art. It should, therefore, be considered merely in an exemplary sense and not in a limiting one.

What I claim is:

1. In a radio signalling system, an antenna, a plurality of oscillation generating means parallelly connected thereto for supplying energy to said antenna, a plurality of the parallelly connected induction motors of like characteristics for individually driving said generators, means for connecting the stator elements of said motors in parallel, means for connecting the rotor elements of said motors in parallel, adjustable keying resistances in the rotor circuits common to all of said motors and fixed smoothing resistances all of equal value in the rotor circuit of each of said motors and individual with respect to each rotor for modulating the circulating current flowing between the said rotor elements to reduce hunting between said generators whereby the voltages supplied thereby to said antenna circuit are maintained in like phase relationship.

2. In a signalling system, an antenna, a plurality of oscillation generating means parallelly coupled thereto for supplying energy to said antenna system, a plurality of parallelly connected induction motors each of like characteristics for individually driving said generators in synchronism, a variable reactance in the stator circuit of each of said motors, means for tying the stator elements of said motors together, means for tying the rotor elements of said motors together, a variable keying resistance in the tie circuit between said rotor elements, said keying resistance being common to each of said motors, and a plurality of fixed smoothing resistances of equal value individual to each of said rotor circuits for reducing circulating current flowing between the said rotor elements and preventing hunting between said generators whereby the voltages induced in said antenna circuit from each of said generators are of like phase relationship and add together in the said antenna circuit.

3. In a radio signalling system, a load circuit, a plurality of oscillation generating means parallelly connected thereto and adapted to supply energy to said load circuit, a plurality of parallelly connected induction motors of like characteristics for individually driving said generators, a pair of tie circuits between said induction motors, means in one of said tie circuits for damping hunting oscillations in said motors and means in said other tie circuit operated by said oscillation generating means for controlling the speed of said motors.

4. In a signalling system, a load circuit, a plurality of oscillation generating means having their outputs parallelly coupled thereto for supplying energy to said load circuit, a plurality of driving means for individually driving said generators, means in the output of each of said oscillation generating means for affecting its individual driving means and the driving means of each of said other oscillation generating means, a tie circuit between all of said driving means and means in said tie circuit for maintaining the voltages supplied by said oscillation generating means to said load circuit in like phase relationship.

5. In a signalling system, a load circuit, a pair of oscillation generating means having their outputs parallelly coupled thereto for supplying energy to said load circuit, a pair of induction motors for individually driving said generators, means in the output of each of said energy sources for affecting its driving motor and the driving motor of the other generator, a tie circuit between said induction motors and means in said tie circuit for maintaining the voltages supplied by said generators to said load circuit in like phase relationship.

6. In a radio signalling system, a load circuit, a plurality of oscillation generating means parallelly connected thereto and adapted to supply energy to said load circuit, a plurality of parallelly connected induction motors each thereof comprising a primary and a secondary winding, an energizing source for energizing said primary windings, a plurality of saturation coils in circuit with said energizing source, means for varying the saturation of said coils comprising a plurality of current sources, relay circuits associated therewith for controlling the current output of said sources and means controlled by said oscillation generating means for controlling said relay circuits.

JAMES L. FINCH.